United States Patent Office 3,055,767
Patented Sept. 25, 1962

3,055,767
METHODS OF COATING FLUORESCENT LAMPS
Robert F. Quirk, Danvers, Mass., assignor, by mesne assignments, to Sylvania Electric Products Inc., Wilmington, Del., a corporation of Delaware
No Drawing. Filed Jan. 30, 1956, Ser. No. 562,022
2 Claims. (Cl. 117—33.5)

This invention relates to materials and methods for coating fluorescent lamp tubes or bulbs with phosphor. The coating is usually applied to the inside surface of the bulb or tube.

The coating material is generally a suspension of phosphor in a viscous medium, the latter being ordinarily a solution of a binding material in an organic solvent. I have discovered that hydroxyethyl cellulose dissolved in water can be used as the suspending medium. Such a medium has the advantage of a saving in solvent costs, because water is cheaper than organic solvents.

In addition, however, it has the altogether unexpected advantage of increasing the light output from the phosphor. A lamp having a coating applied as a suspension of phosphor in a water solution of hydroxyethyl cellulose will give about 3 lumens per watt greater efficiency than a coating applied as a suspension in a solution of ethyl cellulose in xylol, for example. The exact reason for the increase in efficiency is not known.

The hydroxyethyl cellulose suspension, apparently because of its surface tension, has a tendency to bubble or foam when agitated to disperse the phosphor particles. The foaming may cause "pinholes" in the resultant coating on the lamp envelope. These pinholes detract from the appearance of the lamp, but do not prevent the realization of a gain in efficiency.

The pinholes can be eliminated, however, by the use of an anti-foaming agent, for example, ditertiary acetylenic glycol. If the anti-foaming agent is a material such as that mentioned, it will also serve as a dispersing agent or wetting agent for the phosphor particles. In general, however, the use of a separate, additional dispersing agent will improve the coating. Such an agent may be, for example, the trimethyl nonyl ether of polyethylene glycol, which of itself might increase foaming, but which in combination with an antifoaming agent, will give a coating free from pinholes.

I have discovered, too, that hydroxyethyl cellulose as normally manufactured contains about 4% by weight of sodium acetate, which is harmful to the brightness of the coating and presents the gain in efficiency from being realized. The presence of the sodium is especially harmful to the maintenance of light output and efficiency during the life of the lamp, and lamps coated with a suspension of commercial hydroxyethyl cellulose have dropped from an initial output of 65 lumens per watt to an output of 38 lumens per watt after only 100 hours of operation. The hydroxyethyl cellulose should accordingly be purified before use, for example by being washed in methyl alcohol.

Other objects, advantages and features of the invention will be apparent from the following specification, in which a specific embodiment of the invention is described.

For example, about 50 grams of commercial hydroxyethyl cellulose can be purified by adding it to about 1500 cc. of clear methyl alcohol to form a slurry, then filtering, the filtered material being preferably again washed in 1500 cc. of clear methyl alcohol, filtered, washed again, and again filtered. The sodium acetate is removed by this treatment.

The purified 50 grams of hydroxyethyl cellulose, preferably still wet with whatever methyl alcohol may remain in it after the filtering, is then added to about 4 liters of distilled water and thoroughly dissolved. This will give a suspension of about 12 seconds viscosity when measured in the cup described below. In absolute units, the viscosity will be about 15 centipoises per second.

About 300 grams of powdered phosphor, for example, the well-known calcium halophosphate activated with antimony and manganese, is added to 250 cc. of the above-described solution, and 3 grams of an anti-foaming agent such as ditertiary acetylenic glycol, the latter being for example, the material known as Surfynol 102 and sold by Air Reduction Chemical Company of New York. The suspension is placed in a quart ball-mill and milled for about 5 hours.

The resultant suspension will have about 20 seconds' viscosity, when measured in the cup described below, and its viscosity is preferably reduced to about 16 seconds by adding sufficient additional water. The specific gravity of the suspension is then adjusted to a value which will give the desired thickness of applied coating, a specific gravity of about 1.375 being satisfactory.

The specific gravity is adjusted by adding additional 16 second water solution of hydroxyethyl cellulose. When the suspension is ready to be used, about 0.1 cc. of a dispersing agent such as trimethyl nonyl ether of polyethylene glycol is added per 100 cc. of solution. Such a material can be obtained for example, from the Carbide and Carbon Chemicals Company, New York, under the name of "Tergitol Nonionic TMN." The resultant suspension can then be applied to the bulb in the usual manner, for example as shown in Zdancewicz Patent 2,412,954.

The coating is preferably done at ambient temperatures of about 90° F., and dried at that temperature for about one-half hour, with an air flow of about 25 feet per minute through the bulb. The dried tube is then baked in the usual manner, for example by being passed through a lehr at a temperature of 500° C., in about a minute.

The viscosity in seconds given herein was measured as the number of seconds required to empty a special cup, filled with the material being measured, and having a one-eighth inch diameter hole at the center of its bottom, through which the material may flow. The cup is made from a nickel crucible having an inside diameter, at its top, of 1.5 inches. Such a crucible has a flat bottom, which we have rounded out for the present purpose so that the overall inside length from the top of the cup to the bottom is 1½ inches. The cup holds 30 cc. of liquid when filled to the top.

When such a cup is used, a viscosity of 12 seconds measured in the cup corresponds to an absolute viscosity of 15 centipoises per second and a viscosity of 16 seconds so measured corresponds to 38 centipoises per second.

It will be understood that the invention is not limited to the specific embodiment described, and that various modifications can be made therein by a person skilled in the art, without departing from the spirit and scope of the invention. In particular, it should be understood that the invention is not limited to use with the particular phosphor described, but is applicable to phosphors generally, of which magnesium tungstate, manganese-activated zinc silicate, tin-activated calcium orthophosphate, and many others could be cited as examples.

What I claim is:

1. The method of coating a fluorescent lamp envelope with phosphor, said method consisting essentially of: washing a quantity of hydroxyethyl cellulose in methyl alcohol to remove the sodium acetate impurity in it, dissolving the resultant sodium-free hydroxyethyl cellulose in water in proportions of about 50 grams of the hydroxyethyl cellulose to about 4 liters of water, suspending a quantity of inorganic phosphor in said solution, in the proportions of about 300 grams of phosphor to each 250 cc. of solution, adding about 3 grams of an anti-foaming agent, adding about 0.1 cc. of a dispersing agent, applying the resultant solution to the tube to be coated, at an ambient temperature of about 90° F., drying at that temperature for about an hour and a half, with an air flow of about 25 feet per minute through the bulb, and then baking the bulb in a lehr at a temperature of about 500° C. for about one minute.

2. The method of coating a fluorescent lamp envelope with phosphor, said method consisting essentially of: washing a quantity of hydroxyethyl cellulose in methyl alcohol to remove the sodium acetate normally present in said hydroxyethyl cellulose as an impurity, dissolving the resultant purified hydroxyethyl cellulose in water, suspending a substantial amount of inorganic phosphor in said solution, adding an anti-foaming agent and a dispersing agent, and applying the resultant suspension to the inside surface of a fluorescent lamp tube.

References Cited in the file of this patent
UNITED STATES PATENTS 2,726,966     Anderson _____ Dec. 13, 1955

OTHER REFERENCES

Heuser, Emil: "The Chemistry of Cellulose," The Institute of Paper Chemistry, John Wiley & Sons, Inc., N.Y., Chapman & Hall, Ltd., London, copyright 1944, page 422.